United States Patent
Valovick

(10) Patent No.: US 8,262,489 B2
(45) Date of Patent: Sep. 11, 2012

(54) CONSTANT VELOCITY JOINT ATTACHMENT METHOD

(75) Inventor: Brian Michael Valovick, Royal Oak, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 219 days.

(21) Appl. No.: 12/742,285

(22) PCT Filed: Nov. 30, 2007

(86) PCT No.: PCT/US2007/086129
§ 371 (c)(1),
(2), (4) Date: May 11, 2010

(87) PCT Pub. No.: WO2009/070174
PCT Pub. Date: Jun. 4, 2009

(65) Prior Publication Data
US 2010/0267455 A1 Oct. 21, 2010

(51) Int. Cl.
*F16D 1/06* (2006.01)
(52) U.S. Cl. ...... 464/182; 464/906; 403/343; 29/525.01
(58) Field of Classification Search .................. 464/182, 464/906; 403/343, 359.5, 368, 370; 29/525.01
See application file for complete search history.

(56) References Cited

U.S. PATENT DOCUMENTS

| | | | |
|---|---|---|---|
| 6,780,114 B2 * | 8/2004 | Sahashi et al. | 464/906 |
| 2007/0037626 A1 | 2/2007 | Yamazaki | |
| 2008/0107477 A1 | 5/2008 | Cermak | |

FOREIGN PATENT DOCUMENTS

| | | |
|---|---|---|
| DE | 3615858 A1 | 11/1986 |
| DE | 10215657 A1 | 10/2003 |
| EP | 1519063 B1 | 11/2008 |
| GB | 1447078 A | 8/1976 |

* cited by examiner

*Primary Examiner* — Gregory Binda
(74) *Attorney, Agent, or Firm* — Jennifer M. Brumbaugh; Rader, Fishman & Grauer PLLC

(57) ABSTRACT

A shaft member includes a plurality of shaft splines and a shaft preloading portion. The assembly also includes a collar member adjustably coupled to the shaft member and having a collar member groove and a preloading portion formed therein; a first member having a first member groove and a plurality of first member splines formed therein; and a retaining member selectively at least partially interposed within both the collar member groove and the first member groove for restraining axial movement between the shaft member and the collar member. At least a portion of the first member groove and at least a portion of the collar member groove are selectively aligned when the shaft member is at least partially interposed within the first member to permit the retaining member to be at least partially positioned within both the first member groove and the collar member groove.

16 Claims, 5 Drawing Sheets

CONSTANT VELOCITY JOINT ATTACHMENT METHOD

TECHNICAL FIELD

The present disclosure relates to constant velocity (CV) joints generally and more specifically to structures and methods for assembly and disassembly of these connection joints.

BACKGROUND

Universal joints, and especially constant velocity joints, operate to transmit torque between two rotational members. The rotational members are typically interconnected by a cage, or yoke, that allows the rotational members to operate with their respective axes at a relative angle. Constant velocity joints and similar rotating couplings typically include a boot cover assembly to enclose and protect the coupling during operation.

Universal joints are commonly classified by their operating characteristics. One important operating characteristic relates to the relative angular velocities of the two shafts connected thereby. In a constant velocity type of universal joint, the instantaneous angular velocities of the two shafts are always equal, regardless of the relative angular orientation between the two shafts. In a non-constant velocity type of universal joint, the instantaneous angular velocities of the two shafts vary with the angular orientation (although the average angular velocities for a complete rotation are equal). Another important operating characteristic is the ability of the joint to allow relative axial movement between the two shafts. A fixed joint does not allow this relative movement, while a plunge joint does.

Typical plunge ball joints are generally used in many applications, such as in the front propeller shaft of an all-wheel drive vehicle. Specifically, many of these joints may be attached to a pinion shaft of a differential using a coupling mechanism such as a flange connection having a bolted flange extending from the differential pinion gear connected to a flange which is then bolted to a constant velocity joint outer race. However, flange connections between two rotational members may increase undesirable vibrations and misalignments. When a bolted flange connection is positioned between two shafts any misalignment within the bolted connection.

While many constant velocity joints may operate satisfactorily for their intended purposes, constant velocity joints in general are an area of constant innovation. One area for improvement is the assembly and disassembly of the pinion shaft/inner race connection.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following

DETAILED DESCRIPTION

Figure 1:
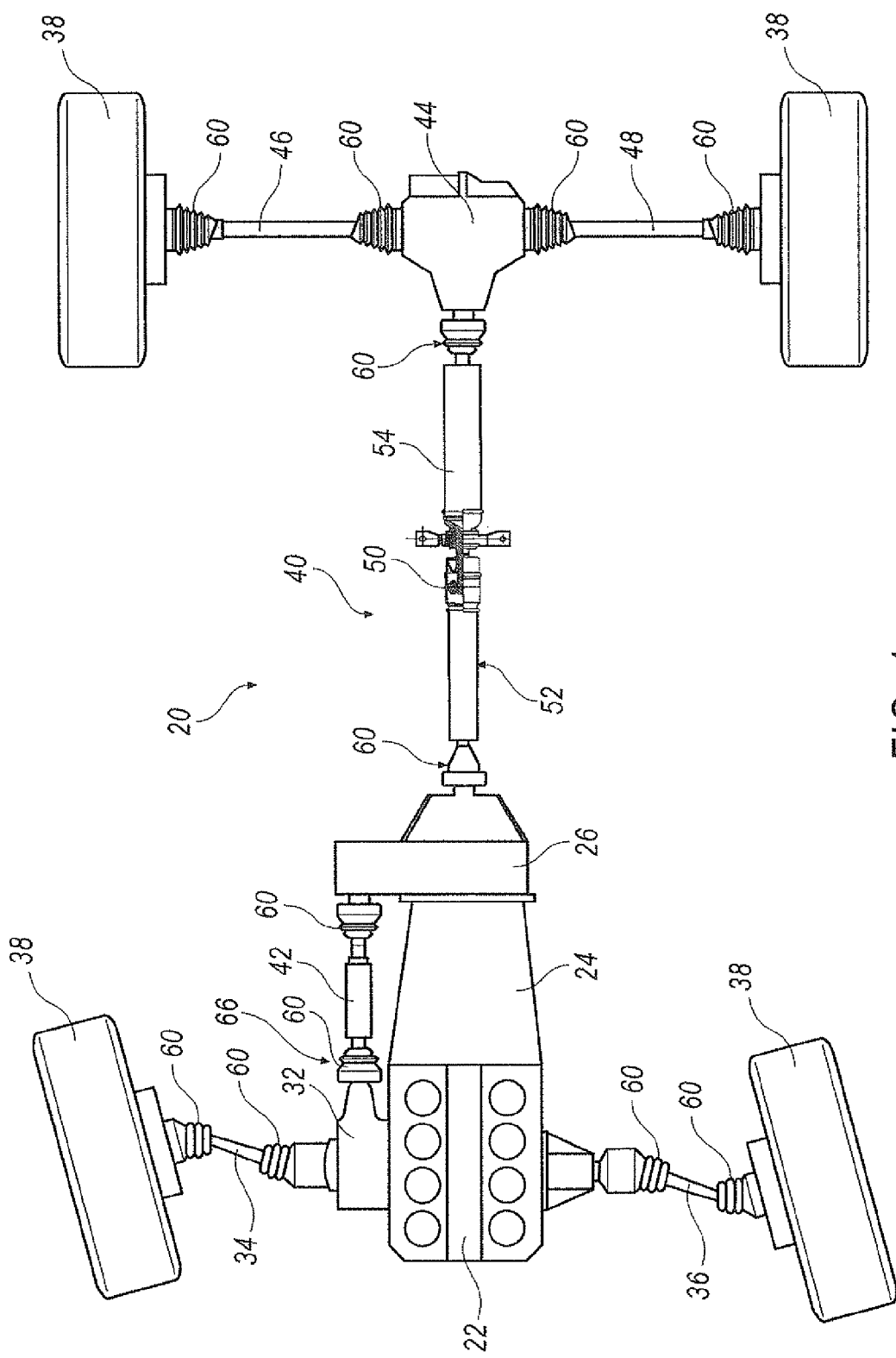
FIG. 1 is a schematic view of a vehicle driveline.

Referring to the drawings, exemplary constant velocity joints are shown. The illustrated constant velocity joints may be fixed constant velocity joints of the monoblock style that may be used in the propeller shaft (prop shaft) of a vehicle. It should be noted, however, that any type of constant velocity joints, including without limitation, tripod, fixed tripod, or the like may be used in accordance with the present invention. That is, one of ordinary skill in the art will recognize the advantages realized by embodiments in substantially all types of constant velocity joints, and other connections between two members. Therefore, the invention should not be limited to the illustrated embodiments.

FIG. 1 illustrates a driveline 20 of a vehicle (not shown). The driveline 20 includes an engine 22 that is connected to a transmission 24 and a transfer case, or power take off unit, 26. A front differential assembly 32 has a right hand front half shaft 34 and a left hand front half shaft 36, each of which are connected to a wheel 38 and deliver power to those wheels 38. The power take off unit 26 has a propeller shaft assembly 40 and a front wheel propeller shaft 42 extending therefrom. The front wheel propeller shaft 42 connects the front differential assembly 32 to the power take off unit 26. The propeller shaft assembly 40 connects the power take off unit 26 to a rear differential 44, wherein the rear differential 44 includes a rear right hand side shaft 46 and a rear left hand side shaft 48, each of which ends with a wheel 38 on one end thereof.

The propeller shaft assembly 40 includes a front prop shaft 52, a rear prop shaft 54, an articulated joint 50 and two high speed constant velocity joints 60. The constant velocity joints 60 transmit power to the wheels 38 through the propeller shaft assembly 40 and the front wheel propeller shaft 42 even if the wheels 38 or the shafts have changing angles due to steering, driveline windup, and suspension jounce and rebound. A constant velocity joint 60 is located on both ends of the half shafts that connect to the wheel 38 and the rear differential 44. On both ends of the right hand front half shaft 34 and left hand front half shaft 36 are constant velocity joints 60.

The constant velocity joints 60 may be of any of the standard types known, such as plunging tripod, cardan joint, cross groove joint, fixed ball joint, fixed tripod joint, or double offset joints, all of which are commonly known terms in the art for different varieties of constant velocity joints. The constant velocity joints 60 allow for transmission of constant velocities at angles which are found in everyday driving of automotive vehicles in both the half shafts and prop shafts of these vehicles.

The driveline 20 represents an all wheel drive vehicle, however it should be noted that the embodiment of the constant velocity joints 60 of the current disclosure can also be used in rear wheel drive vehicles, front wheel drive vehicles, all wheel drive vehicles and four wheel drive vehicles.

For purposes of this discussion, a representative portion of the driveline 20 is selected as a driveline component 66. The driveline component 66 defines the connection between the front wheel propeller shaft 42 and the front differential assembly 32, and includes portions of the front wheel propeller shaft 42 and the front differential assembly 32.

Figure 2:
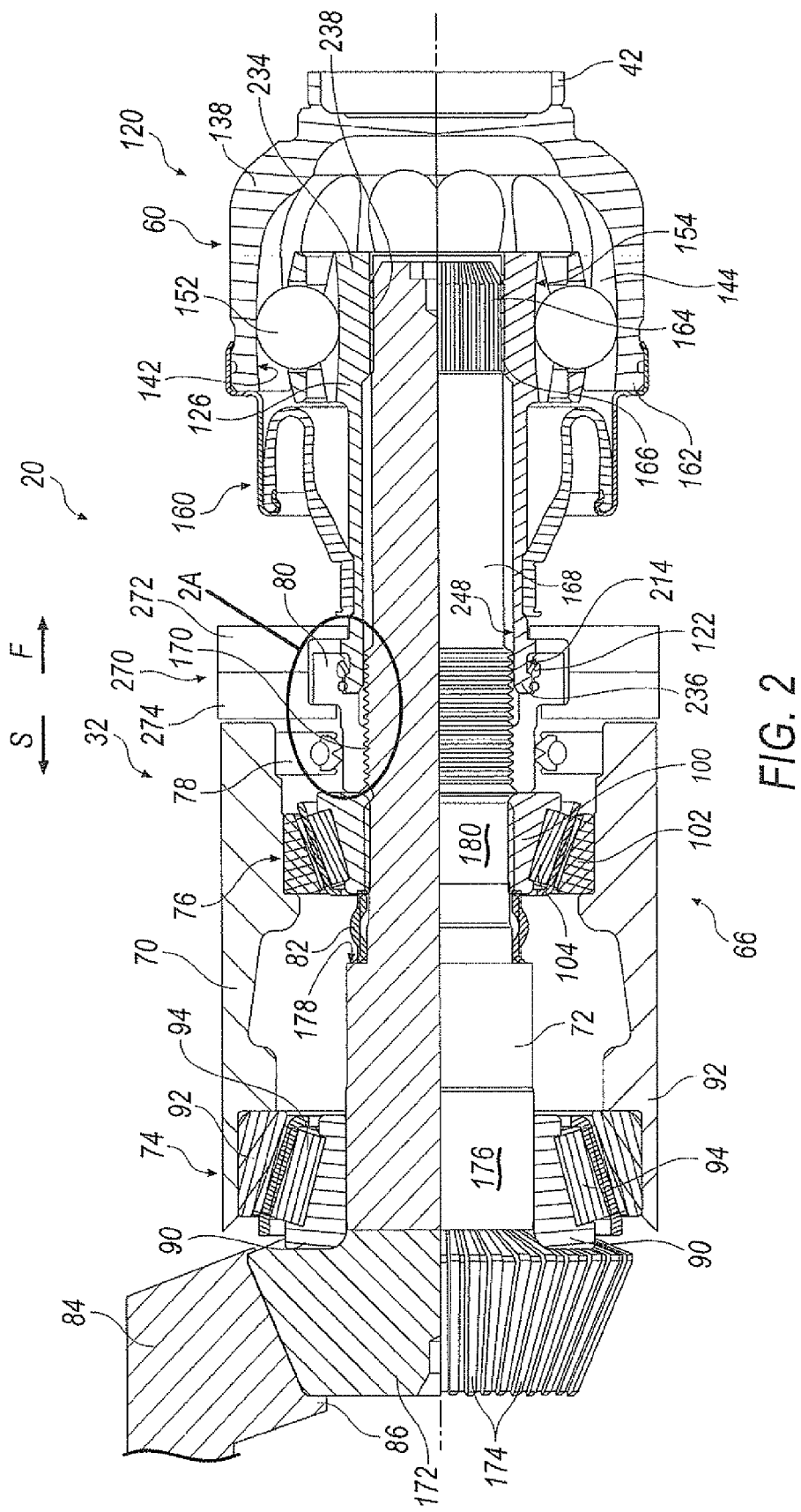
FIG. 2 is a partial sectional view of a constant velocity joint assembly.

FIG. 2 illustrates the driveline component 66 removed from the driveline 20 and in greater detail. The front differential assembly 32 includes a housing 70 (partially illustrated), a pinion shaft 72 having an axis A-A, a first bearing 74, a second bearing 76, a seal 78, a preload collar member 80, a preload biasing portion 82, and a ring gear 84 having a plurality of ring gear teeth 86. The bearings 74, 76 are roller thrust bearings that carry both radial and axial loadings and are used to maintain the pinion shaft 72 in a desired position relative to the ring gear 84. The first bearing 74 includes a first bearing inner race 90, a first bearing outer race 92, and a plurality of first bearing rollers 94. The second bearing 76 includes a second bearing inner race 100, a second bearing outer race 102, and a plurality of second bearing rollers 104.

The constant velocity joint 60 that is a portion of the driveline component 66 will be referred to herein as a constant velocity joint 120. The constant velocity joint 120 is coupled to the shaft 72, at least in part, by a retaining member 122, as described in greater detail below.

Referring further to FIG. 2, the constant velocity joint 120 is shown according to an embodiment. The illustrated constant velocity joint 120 includes an inner race, or first member, 126, and an outer race 138 with the front wheel propeller shaft 42 attached thereto. Torque is transmitted between the front wheel propeller shaft 42 and the ring gear 84 as described in greater detail below. An inner wall 142 of the outer race 138 generally defines a constant velocity joint chamber 144. At least a portion of the inner race 126 is located or housed within the outer race 138. A plurality of balls, or rolling elements, 152 are located between an outer CV surface 154 of the inner race 126 and the inner wall 142 of the outer race 138. The rolling elements 152 are generally arranged in an array circumferentially spaced about the inner race 126. The joint 120 may include six, eight, or any number of rolling elements 152, as desired. A boot assembly 160 has one end connected to an end 162 of the outer race 138.

With combined reference to FIGS. 2-3, the interconnection between shaft 72 and inner race 126 will be discussed in greater detail. Shaft 72 includes a race end 164 with a plurality of shaft splines 166 formed therein and a retaining surface 168 defining a threaded portion 170 (FIG. 2A) formed circumferentially therein, a pinion gear end 172 having a plurality of pinion teeth 174 formed thereon, a first bearing surface 176, a preload shoulder 178, and a second bearing surface 180. The pinion teeth 174 are meshed with the ring gear teeth 86 of the ring gear 84.

Figure 2A:
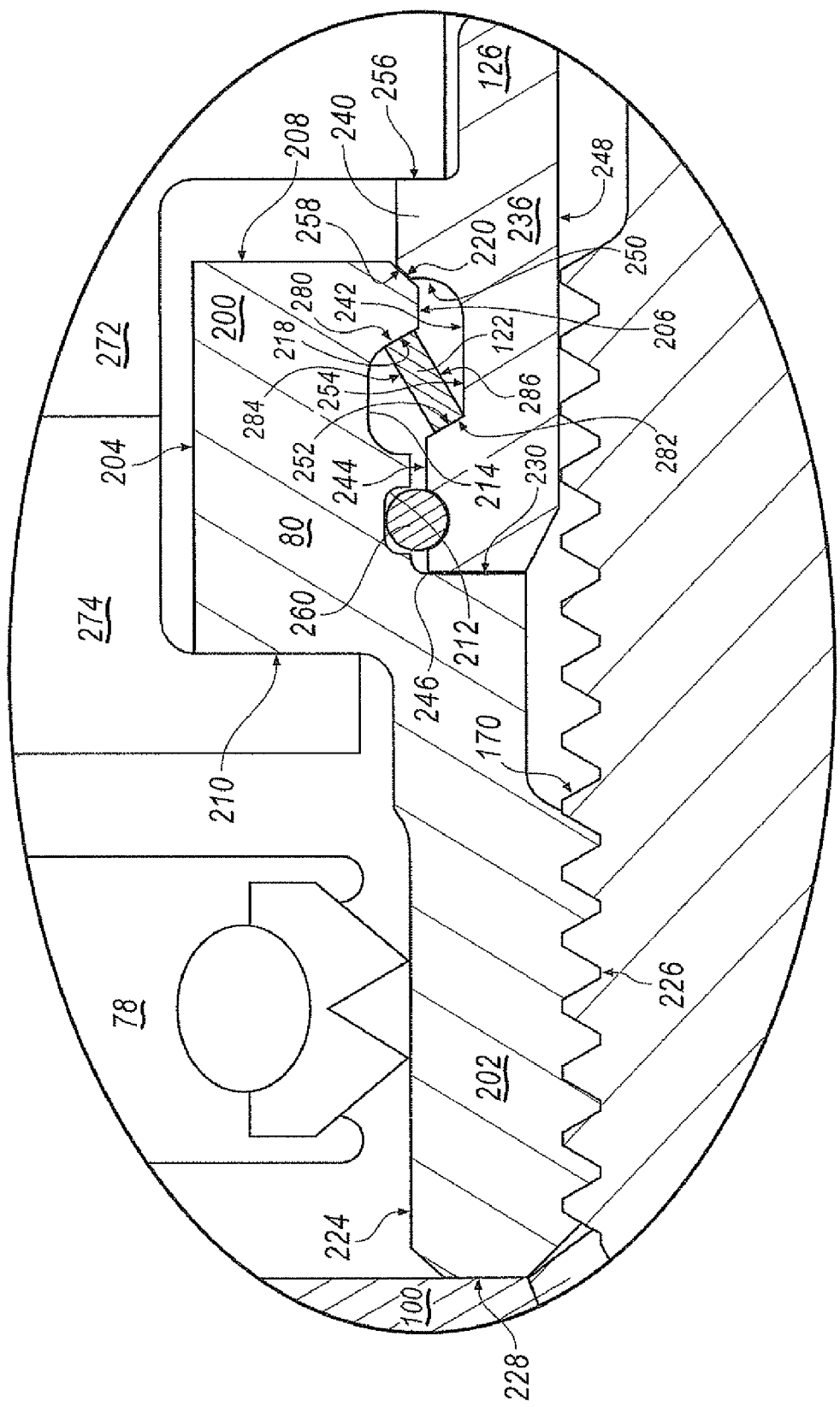
FIG. 2A is an enlarged view of portion 2A of FIG. 2.

As best seen in FIG. 2A, the collar member 80 includes a generally annular first collar portion 200 and a generally annular second collar portion 202. The first collar portion 200 includes a first outer surface 204, a first inner surface 206, a first end surface 208, and a first connecting surface 210. The first inner surface 206 includes a seal groove 212, a retaining groove 214 having a generally frusto-conical retaining surface 218, and a generally frusto-conical collar chamfer 220. The second collar portion 202 includes a second outer surface 224 a second inner surface 226, a second end surface 228, and a second connecting surface 230. As illustrated, the second inner surface 226, also referred to as a preloading portion 226, is threaded to mate with the threaded portion 170 of the shaft 72. The shaft member 72 may include a plurality of shaft splines 166, the threaded portion 170 and shaft preloading portion 226. The assembly may also include a collar member 80 adjustably coupled to the shaft member and having a collar member groove 214 and the preloading portion formed 226 therein, wherein at least one of the first member groove and the collar member groove is a circumferential groove. A first member 126 may have a first member groove 242 and a plurality of first member splines 238 formed therein, A retaining member 122 may be selectively at least partially interposed within both the collar member groove and the first member groove for restraining axial movement between the shaft member and the collar member.

Described in greater detail, the inner race 126 includes a first end 234 and a second end 236. The first end 234 includes the outer CV surface 154 and a plurality of race splines 238 formed therein. The second end 236 includes a race shoulder 240, a race groove 242, a race step 244, an endmost outer edge 246, and a second race inner surface 248. Each race spline 238 extends radially (toward axis A-A) and axially from inner race 126. The race groove 242 includes a generally annular first wall 250, a generally frusto-conical second wall 252, and a generally cylindrical race groove inner wall 254. The race shoulder 240 of the inner race 126 also includes an assembly coupling surface 256 and a race chamfer 258 formed thereon. Race splines 238 matingly engage shaft splines 166 to transmit torque therebetween.

A seal 260 is interposed within the seal groove 212. As illustrated, the seal 260 is an o-ring, although other sealing members may be used. A portion of an assembly press 270 is illustrated to include a first press portion 272 and a second press portion 274. The assembly press 270 may force the first press portion 272 toward the second press portion 274 during assembly of the driveline component 66, as discussed in greater detail below.

In the embodiment illustrated, the retaining member 122 is a circular ring with a generally rectangular cross-section, although a split ring with a gap between circumferential ends may be used. Specifically, the retaining member 122 includes a collar retaining surface 280, a race retaining surface 282, a first retaining surface 284, and a second retaining surface 286. Each of the surfaces 280, 282, 284, 286 is generally frusto-conical. The retaining member 122 may be positioned within the retaining groove 214 before the inner race 126 is interposed through, or moved rectilinearly within, the collar member 80.

One method of assembly of the driveline component 66 is as follows. The bearings 74, 76 and seal 78 are interposed within the housing 70 as generally shown in FIG. 3. The seal 260 is interposed within the seal groove 212 and the retaining member 122 is interposed within the retaining groove 214 of the collar member 80. The shaft 72 is then interposed within the housing 70 as generally shown in FIG. 3, and the collar member 80 is threaded onto the threaded portion 170 of the shaft 72. The collar member 80 is threaded until the bearings 74, 76 are preloaded, as desired. This preload is provided by elastically deforming the preload biasing portion 82 as the collar member 80 is rotated relative to the shaft 72 as the threaded second inner surface 226 of the collar 80 moves along the threaded portion 170 to axially move the second bearing inner race 100 toward the first bearing inner race 90 (generally in the direction of the arrow S). Accordingly, the elastic deformation of the preload biasing portion 82 will result in a generally predetermined force that is transmitted through the bearings 74, 76. This preload may stabilize the rotation of the shaft 72 and position the pinion gear end 172 relative to the ring gear 84 for proper lash of teeth 86 with teeth 174.

Although the retaining member 122 is at least partially interposed within the retaining groove 214 of the collar member 80 prior to coupling the collar member 80 to the shaft 72, the retaining member 122 may be at least partially interposed within the race groove 242 of the inner race 126 prior to coupling the collar member 80 to the inner race 126. The joint 120 may be assembled as generally shown in FIG. 3 prior to coupling the collar member 80 to the inner race 126.

Figure 3:
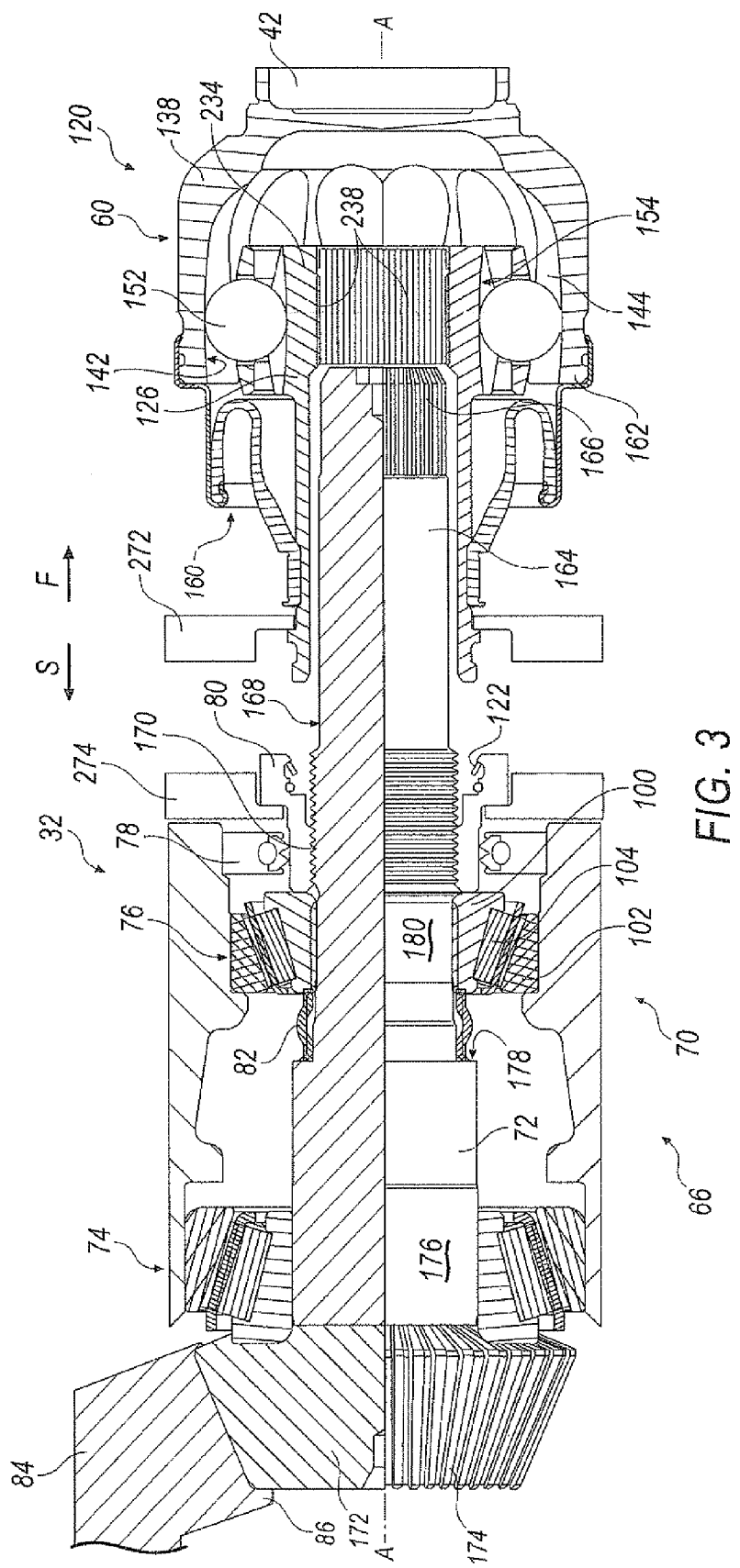
FIG. 3 is a partial sectional exploded view of the assembly of FIG. 2.

To connect the shaft 72 with the inner race 126 for retention therein, specific reference is made to FIGS. 2 and 3. As seen in FIG. 3, the shaft 72 is interposed through inner race 126 in a first direction, or in the direction of arrow F. The shaft splines 166 intermesh with the race splines 238, as described in greater detail below.

As the shaft 72 is further moved in the direction of the arrow F, the inner race 126 will guide within the collar member 80. Specifically, the endmost outer edge 246 of the inner race 126 will guide within the collar chamfer 220 to further align the shaft 72 with the inner race 126. As the shaft 72 is moved further in the direction of the arrow F, the endmost outer edge 246 of the inner race 126 will contact the retaining member 122. Further movement of shaft 72 in the direction of the arrow F will cause the retaining member 122 to expand radially outwardly (away from the axis A-A) as the endmost outer edge 246 of the inner race 126 guides past the retaining member 122. Retaining member 122 will expand until an inner diameter defined by retaining member 122 is generally equal to the outer diameter defined by the race step 244. Even further movement of shaft 72 in the direction of the arrow F relative to the inner race 126 will cause the retaining member 122 to be biased at least partially into the retaining groove 214 as the endmost outer edge 246 of the inner race 126 guides past the seal 260. As the shaft 72 and the inner race 126 are positioned generally shown in FIG. 2A, the frusto-conical second wall 252 of the inner race 126 moves into engagement with the retaining member 122. That is, the retaining member 122 will guide along and past the race step 244 (being biased inwardly thereto by the elastic deformation of the retaining member 122) until the retaining member 122 will at least partially deform into the race groove 242, as shown in FIG. 2A.

Axial movement of the shaft 72 in the direction of the arrow S relative to the inner race 126 will be inhibited by the interference of the retaining member 122, the retaining groove 214, and the race groove 242. That is, the collar retaining surface 280 of the retaining member 122 will interfere with the retaining surface 218 of the collar 80, and the race retaining surface 282 of the retaining member 122 will interfere with the second wall 252 of the inner race 126.

The shaft splines 166 may be dimensioned such that an interference fit (press fit) is required to engage the shaft splines 166 with the race splines 238. To provide the interference fit, the driveline component 66 is assembled as generally shown in FIG. 3 with the splines 166, 238 aligned for engagement. The first press portion 272 of the assembly press 270 is placed adjacent the assembly coupling surface 256 of the inner race 126 and the second press portion 274 is placed adjacent the first connecting surface 210 of the collar member 80. The assembly press 270 will then move first press portion 272 toward the second press fit portion 274 applying a generally axial interference fit force until the driveline component 66 is generally in the configuration of FIG. 2. Generally, an interference fit includes the mating of two components where a force is required to at least partially elastically deform one of the components as the components are mated.

Thus assembled as in FIG. 2, the shaft splines 166 are selectively positioned within the array of the rolling elements 152. Since the center of articulation of the joint 120 is generally located at the center of the array of rotational elements 152, positioning the splined engagement of the shaft splines 166 and the race splines 238 radially aligned with the array of rolling elements 152 may permit any misalignment of the splined engagement of the shaft splines 166 and the race splines 238 to be at least partially negated by the self-centering capability of the joint 120 within the array of rolling elements 152. While splines 166, 238 are generally illustrated as generally rectangular projections, the splines 166, 238 may be any suitable surface contour used to couple the shaft 72 for rotation with the inner race 126, including generally cylindrical surfaces.

Figure 4:
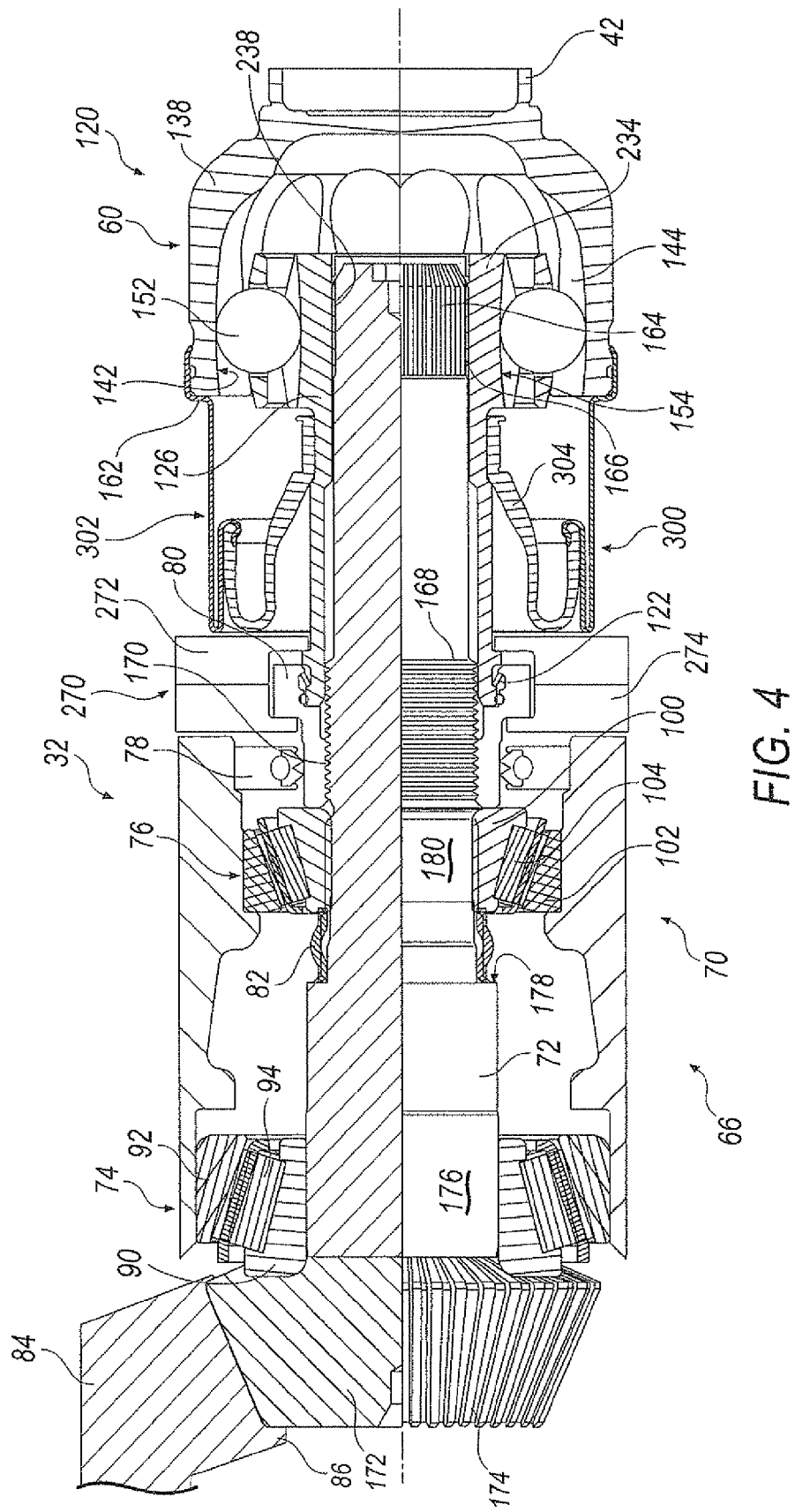
FIG. 4 is a partial sectional view of another embodiment assembly.

FIG. 4 illustrates the driveline component 66 with an alternative embodiment of the boot assembly 160 as a boot assembly 300. The boot assembly 300 includes a boot can 302 and a boot 304. Either the boot assembly 160 or the boot assembly 300 may be used, as desired Although the steps of the method of assembling the driveline component 66 are listed in a preferred order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A joint assembly comprising:
   a shaft member rotationally coupled to a housing, the shaft member including a plurality of shaft splines and a shaft preloading portion;
   a collar member adjustably coupled to the shaft member and having a collar member groove and a preloading portion formed therein;
   an inner race of a constant velocity joint having an first member groove and a plurality of first member splines formed therein, wherein the constant velocity joint includes an outer race and a plurality of spherical rotational members interposed between and in contact with the outer race and the inner race; and
   a retaining member selectively at least partially interposed within both the collar member groove and the first member groove for restraining axial movement between the shaft member and the collar member, wherein at least a portion of the first member groove and at least a portion of the collar member groove are selectively aligned when the shaft member is at least partially interposed within the inner race to permit the retaining member to be at least partially positioned within both the first member groove and the collar member groove and wherein at least a portion of the plurality of shaft splines are selectively positioned within an array of the spherical rotational members.

2. The assembly of claim 1, wherein the shaft member includes a plurality of gear teeth formed thereon for transmitting torque through a driveline.

3. The assembly of claim 1, wherein the shaft splines are dimensioned for an interference fit with the first member splines.

4. The assembly of claim 1, further comprising at least one bearing interposed between the housing and the shaft member, wherein the collar member may be moved relative to the shaft member to apply a preload to the at least one bearing.

5. The assembly of claim 1, wherein at least one of the first member groove and the collar member groove is a circumferential groove.

6. A joint assembly comprising:
   a shaft member rotationally coupled to a housing, the shaft member including a plurality of shaft splines and a shaft preloading portion;
   a collar member adjustably coupled to the shaft member and having an collar member groove and a preloading portion formed therein;
   a constant velocity joint, including an inner race, an outer race and a plurality of spherical rotational members interposed between and in contact with the outer race and the inner race, wherein the inner race includes a inner race groove and a plurality of inner race splines formed therein, and wherein at least a portion of the plurality of shaft splines are selectively positioned within an array of the spherical rotational members; and
   a retaining member selectively at least partially interposed within both the collar member groove and the inner race groove for restraining axial movement between the shaft member and the inner race.

7. The assembly of claim 6, wherein the shaft member includes a plurality of gear teeth formed thereon for transmitting torque through a driveline.

8. The assembly of claim 6, further comprising at least one bearing interposed between the housing and the shaft member, wherein the collar member may be moved relative to the shaft member to apply a preload to the at least one bearing.

9. The assembly of claim 8, wherein the shaft preloading portion is a preload biasing portion interposed between the bearing and a portion of the shaft member for, wherein the preload biasing portion is at least partially deformed when the bearing is preloaded.

10. The assembly of claim 6, wherein the shaft splines are dimensioned for an interference fit with the inner race splines.

11. A method of assembly for a driveline component, comprising:
    interposing a shaft within at least one bearing;
    positioning the shaft adjacent a collar member;
    positioning a preload biasing portion between the bearing and a portion of the shaft;
    preloading the bearing, wherein moving the collar member relative to the shaft, at least in part, increases the preload and at least partially deforms the preload biasing portion;
    coupling a first portion of the collar member of a constant velocity joint to a portion of an inner race such that at least a portion of a collar member groove formed in the collar member and at least a portion of a race groove formed in the inner race are selectively at least partially aligned when the inner race is at least partially interposed within the first portion; and
    inserting a retaining member at least partially within at least one of the collar member groove and the race groove.

12. The method of claim 11, further comprising applying a generally axial interference fit force to at least one of the preload member and the first portion to urge the shaft to move relative to the first portion, wherein the axial interference fit force will at least elastically deform at least a portion of one of the shaft and the first portion.

13. The method of claim 11, wherein coupling the first portion of the constant velocity joint includes inserting a portion of the inner race of the constant velocity joint into a portion of the collar member.

14. The method of claim 13, further comprising deflecting at least a portion of the retaining member radially as the inner race is inserted within the portion of the collar member.

15. The method of claim 11, further comprising interposing the inner race within the first portion of the constant velocity joint.

16. The method of claim 11, further comprising interposing a seal between a surface of the collar member and a surface of the inner race of the constant velocity joint.

* * * * *